Aug. 7, 1923.
R. S. BLAIR
1,463,865
FLUID METER
Filed Dec. 5, 1917
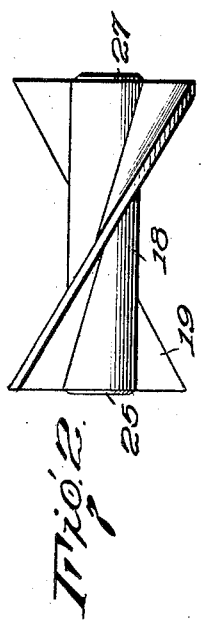
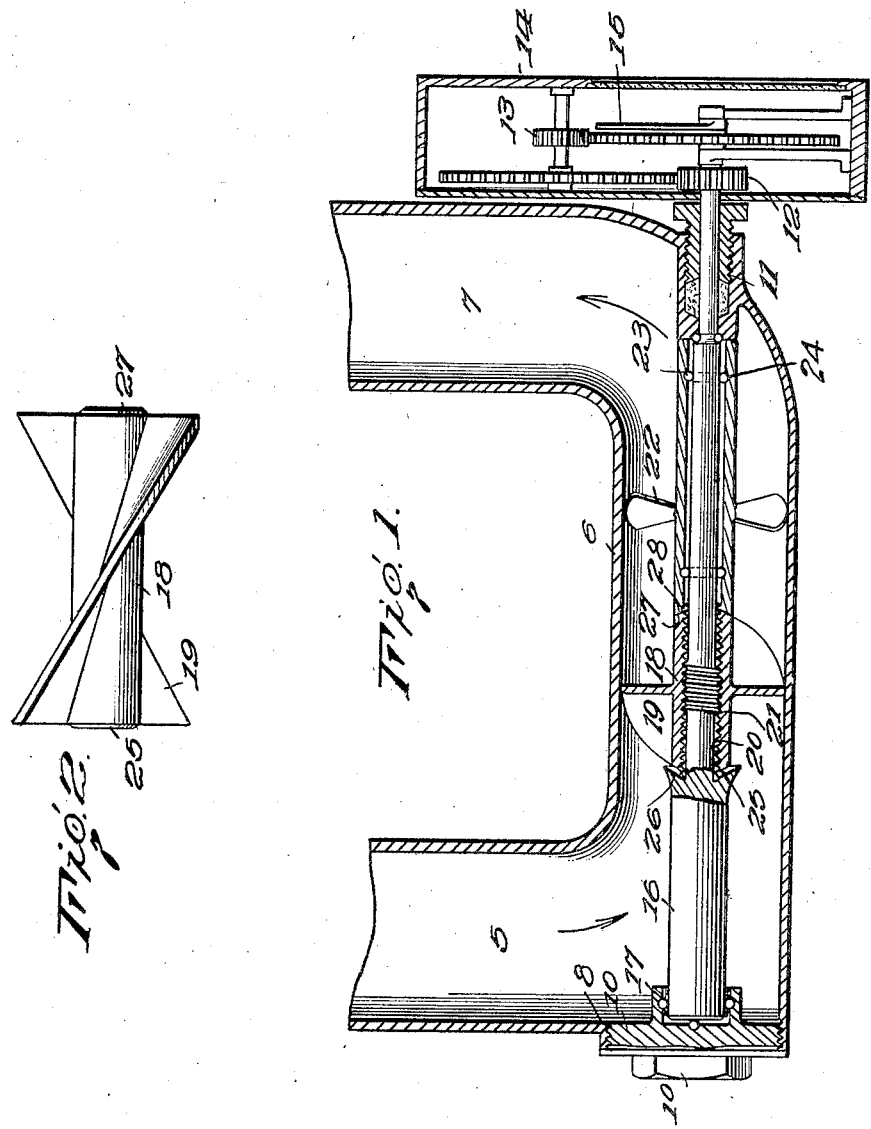
Inventor
R. S. Blair
By
Attorney Patented Aug. 7, 1923.

1,463,865

UNITED STATES PATENT OFFICE.

ROBERT S. BLAIR, OF SOUND BEACH, CONNECTICUT.

FLUID METER.

Application filed December 5, 1917. Serial No. 205,658.

*To all whom it may concern:*

Be it known that I, ROBERT S. BLAIR, a citizen of the United States of America, residing at Sound Beach, in the county of Fairfield and State of Connecticut, have invented certain new and useful Improvements in Fluid Meters, of which the following is a specification.

This invention relates to meters, and more particularly to fluid meters adapted to measure and register the rate of relative flow of a fluid. While particularly adapted for measuring the flow of water, gas and the like, it is, of course, to be understood that its broader features are well suited for use in anemometers, marine logs and similar instruments.

One of the objects of the present invention is to provide a simple and practical meter of the above general character adapted to accurately measure the relative flow of a fluid. Another object is to provide a meter of the above nature having relatively few parts which will be inexpensive to manufacture and easy to assemble. Another object is to provide a compact, automatic meter of the above nature which will be reliable and efficient in use and operation.

Other objects will be in part obvious and in part indicated hereinafter.

This invention accordingly consists in the features of construction, combination of parts and in the unique relations of the members and in the relative proportioning and disposition thereof all as more completely outlined herein.

To enable others skilled in the art so fully to comprehend the underlying features thereof that they may embody the same by the numerous modifications in structure and relation contemplated by this invention, drawings depicting an illustrative form have been annexed as a part of this disclosure, and in such drawings, like characters of reference denote corresponding parts through all the views:

Figure 1 is a longitudinal sectional view; and

Figure 2 is a detail view of one of the elements.

Referring now to the drawings in detail and more particularly to Fig. 1, 5 denotes the inlet passage of a meter casing 6 provided with an outlet passage 7, the casing being of substantially U-shaped construction. This casing or conduit is provided at one end with a threaded opening 8 adapted to receive a closure member 10 of sufficient size to permit convenient access to the interior. This member supports one end of the actuated measuring mechanism hereinafter described. The opposite end is supported in a stuffing box 11 and terminates in a gear 12 coacting with certain reducing gearing 13 positioned within a housing 14 and in turn actuating a dial pointer 15 of any desired type for indicating the revolution of the parts.

The measuring mechanism shown in Fig. 1 comprises a shaft 16 having one end suitably supported in a bearing 17 carried by the closure member 10. The opposite end of this shaft 16 carries the gear 12. Mounted upon the shaft so as to turn substantially therewith at all times is a sleeve member 18 having high pitched propeller vanes 19 adapted to be rotated by and at a rate proportional to the flow of liquid through the casing. These vane members are obviously inclined with respect to the direction of flow of fluid through the casing. The sleeve 18 of the rotor has a central threaded bore 20 adapted to coact with a threaded section 21 on the shaft 16, whereby it may have a relative turning movement with respect to the shaft. This thread is sufficiently steep to prevent jamming of the parts and may be in the form of a spiral groove with a ball therein. Such relative turning movement will cause a corresponding longitudinal adjustment in one direction or the other, according to the direction in which rotation occurs. This adjustment is gained by a transverse movement of the controlling part; and it may here be noted that the term "transverse" is used broadly to denote merely a non-longitudinal direction and not necessarily a direction at right angles to the current.

Adjacent this sleeve 18 is a power element in the form of a low pitched propeller 22 having two or more vanes or blades as may be necessary and supported on the shaft 16 by means of ball bearings 23 adapted to travel in grooves 24 in the sleeve and shaft.

The left-hand end of the sleeve 18 of the rotor may be provided with a clutch surface 25 adapted to co-act with a complementary clutch surface 26 in the shaft 16. This latter is preferably flared outwardly to a slight extent to obviate the force of the current on the forward end of sleeve 18.

At the rear end of the sleeve 18 is provided a clutch surface 27 co-acting with a clutch surface 28 upon the rotating device 22.

In the operation of the apparatus, the device driven by propeller 22 serves as a source of power from which the measuring rotor may be automatically supplied to compensate for friction and like factors. This member 22 is driven at higher angular speed than that of the sleeve 18, the precise speed of the former being unimportant, and is of sufficient power to supply the needs of the measuring element. The rotor having the vanes 19, normally rests with the clutch surfaces 27 and 28 in engagement. When the apparatus is started, however, by the flow of fluid or liquid, the superior speed imparted to the vanes 19 by the device 22 tends to give an excessive pressure upon the forward surfaces of the latter vanes (with respect to their direction of rotation) and hence unscrews the sleeve 18 upon the thread 21. This lessens the contact between the clutch surfaces 27 and 28, thus causing the sleeve 18 to rotate at slower speed. If its speed however tends to become less than that of one revolution for each time that the fluid flow travels through the pitch distance of the vane, there will then be an excessive pressure on its rear surface which will screw the device more firmly into engagement with clutch surface 28, and it will take from the member 22 just sufficient turning force to bring it up to non-slipping speed. In practice the rotor finds substantially a position of rest in which it is automatically drawing from the device 22 just sufficient rotative force to compensate for any tendency to slip. Thus the connection between the rotor and the source of power is increased or reduced in effectiveness according as the rotor needs more or less effective power supplied to it to eliminate slip; and it may here be noted that expressions of the nature of "reduced in effectiveness" are broadly used to include an action in which the connection is entirely broken and thus reduced in effectiveness to zero.

Obviously although there is no friction (using the term in its usual sense) between the threads, nevertheless when the sleeve 18 ceases to travel lengthwise and the threaded inner spindle is held against lengthwise movement, then the spindle must have the same angular speed as the threaded rotor mounted thereon.

The clutch members 25 and 26 serve simply as an emergency engagement under certain conditions of use, but in normal use, it is simply the clutch members 27 and 28 which act.

It may be noted that the term "forward" as used herein and throughout the claims refers to a direction toward the inlet end of the meter casing.

As various possible embodiments might be made of the above invention and as various changes might be made in the embodiment above set forth, it is to be understood that all matter herein set forth or shown in the accompanying drawing is to be interpreted as illustrative and not in a limiting sense.

I claim:

1. In a meter construction, in combination, a member mounted to be exposed to fluid current and movable transversely of said current, an auxiliary source of power, and means adapted upon the transverse pressure components upon opposite sides of said member becoming substantially unbalanced to bring said member into increased or decreased effectiveness of connection with said source of power.

2. In meter construction, in combination, a rotary member having inclined portions mounted to be exposed to fluid current and movable transversely of said current, an auxiliary source of power adapted to drive said rotary member, and means adapted upon the transverse pressure components upon opposite sides of said member becoming substantially unbalanced to vary the effective power supplied to said rotary member and thereby re-balance said pressures.

3. In meter construction, in combination, a rotary member having inclined portions mounted to be exposed to fluid current and movable transversely of said current, an auxiliary source of power mounted adjacent said first mentioned member, and means adapted upon the transverse pressure components upon opposite sides of said first mentioned member becoming substantially unbalanced to bring said member into or out of connection with said source of power, according as the pressure upon the forward surface in the transverse direction of rotation tends to fall below or to exceed that upon the rear surface.

4. In meter construction, in combination, a member mounted to be exposed to fluid current and movable transversely of said current, an auxiliary source of power driven by said fluid current, indicating mechanism driven from said first member, and means adapted upon the transverse pressure components on opposite sides of said first member becoming substantially unbalanced, to vary the effectiveness of connection between said member and said source of power to thereby relieve said unbalanced condition.

5. In meter construction, in combination, a member exposed to fluid current and driven thereby, a second member driven by said fluid current at a higher speed, and means adapted upon slip of said first member occurring with respect to said current automatically to bring said first member into operative relation to said second member whereby it is driven thereby and the slip eliminated.

6. In meter construction, in combination, a member exposed to fluid current and driven thereby, a second member driven by said fluid current at a higher speed and having operative connection with said first member under certain conditions, and means whereby upon said second fluid driven member driving said first member too fast the operative connection between said members is reduced in effectiveness.

7. In meter construction, in combination, a rotary member inclined with respect to the direction of flow and exposed to the fluid current and adapted to be driven thereby, a similar member operatively connected therewith under certain conditions and adapted to be driven by said fluid current at a higher speed, and means adapted to reduce in effectiveness the operative connection between said rotary driven members when said second driven member drives the first member too fast.

8. In meter construction, in combination, a rotary member inclined with respect to the direction of flow of current and adapted to be driven by the current passing thereby, a second similarly shaped member driven by said current at a higher speed, a clutch connection between said members, and means associated with said members whereby when said second mentioned driven member drives the first mentioned member too fast, the clutch connection therebetween will be reduced in effectiveness.

9. In meter construction, in combination, a rotary member inclined with respect to the direction of flow of current and adapted to be driven by the current passing thereby, a second similarly shaped member driven by said current at a higher speed, a slipping friction clutch connection between said members, and means associated with said members whereby when said second mentioned driven member drives the first mentioned member too fast, the slipping friction clutch connection therebetween will be reduced in effectiveness.

10. In meter construction, in combination, a conduit through which a liquid is adapted to pass, power-transmitting means adapted to convey motion to a register, a rotary member positioned within said conduit and inclined with respect to the direction of flow of liquid therethrough and adapted to rotate said first mentioned means substantially proportionally to the rate of flow of said current, the forward edge of said member being shaped to bring the end surface substantially transverse to the direction of said current, and means including a power-driven element for compensating automatically for a difference between the rate of flow of said current and the rate of movement of said first-mentioned means.

11. In meter construction, in combination, a rotary member, indicating means connected therewith, a conduit within which said member is positioned adapted to have a fluid current traveling therethrough, a member mounted in the path of said current and inclined with respect thereto to rotate with said first member and drive the same, a member of a relatively low pitch mounted upon said first member in a position inclined with respect to said fluid current and co-axially with said first inclined member, means adapted to form a power-transmitting connection between said inclined members, and means whereby the effectiveness of said power-transmitting connection is controlled by inequality of fluid pressure upon the opposite sides of said first inclined member.

12. In meter construction, in combination, a member mounted to be exposed to fluid current and movable transversely of said current, an auxiliary source of power, and means adapted upon slip of said first member occuring with respect to said current automatically to bring said member into operative relation to said auxiliary source of power whereby it is driven thereby and the slip eliminated.

13. In meter construction, in combination, a rotary member, indicating means connected therewith, a conduit within which said member is positioned adapted to have a fluid current traveling therethrough, a member mounted in the path of said current and inclined with respect thereto to rotate with and drive said first member, an inclined member of a relatively low pitch, said inclined member mounted upon said first member and co-axially with said first inclined member, means adapted to form a power-transmitting connection between said inclined members, and means whereby the effectiveness of said power-transmitting connection is controlled by inequality of fluid pressure upon the opposite sides of said first inclined member, said first inclined member being so mounted upon said rotary member as to permit relative rotary movement therebetween.

14. In meter construction, in combination, a device comprising a member adapted to be exposed upon both sides to a fluid current and to be driven by said current, a source of power deriving its energy from the passing current and having a connection with said member, and means controlled by inequality of fluid pressure on opposite sides of said member to impart a varying effective driving force to said device.

15. In meter construction, in combination, a conduit through which a fluid is adapted to pass, an indicating device, power-transmitting means adapted to convey motion to said indicating device, means for rotating said power-transmitting means by, and substantially proportionally to, the rate of flow of the fluid current, and means including a power-driven element for compensating automatically for a difference between the rate of flow of said current and the rate of movement of said power-transmitting means.

16. In meter construction, in combination, a conduit through which a fluid is adapted to pass, an indicating device, a power shaft connected therewith, a member mounted to be rotated by the fluid current, driving means deriving energy from the flow of said current and means controlled by inequality of pressures on said member adapted automatically to supply to the said shaft from said driving means a driving tendency equal to that required to compensate for slip of said member.

17. In meter construction, in combination, a conduit through which a fluid is adapted to pass, a power shaft, means including a rotor for rotating said shaft by the action of the fluid and at a rate which varies with the rate of flow of said fluid in said conduit, an auxiliary driving element deriving power from said fluid and independently rotatable upon said shaft, and a variable power-transmitting connection between said rotor and said element.

18. In meter construction, in combination, a conduit through which fluid is adapted to pass, a power transmitting shaft, an indicating device connected with said shaft, means for rotating said shaft substantially proportionally to the rate of flow and mounted for relative movement upon said shaft, and means deriving energy from said fluid for compensating for the difference between the rate of rotation of said means and the rate of flow.

19. In meter construction, in combination, a conduit through which liquid is adapted to pass, a power transmitting shaft, means for rotating said shaft substantially proportionally to the rate of flow comprising a rotor capable of relative movement and means for compensating for the difference between its rate of rotation and the rate of flow including a member having a speed varying connection with said rotor.

20. In meter construction, in combination, a conduit through which fluid is adapted to pass, a power transmitting shaft, means for rotating said shaft including a rotor having a threaded connection with said shaft, and means controlled by relative rotation of said rotor, a shaft adapted to tend to vary the speed of said shaft in accordance with the direction of such relative rotation.

In testimony whereof I affix my signature in the presence of a witness.

ROBERT S. BLAIR.

Witness:
T. A. BLAIR.